United States Patent [19]
Jakeman et al.

[11] 3,971,956
[45] July 27, 1976

[54] MEASUREMENT OF SURFACE ROUGHNESS

[75] Inventors: Eric Jakeman, Birtsmorton; Peter Nicholas Pusey, Malvern, both of England

[73] Assignee: National Research Development Corporation, London, England

[22] Filed: Jan. 20, 1975

[21] Appl. No.: 542,406

[30] Foreign Application Priority Data
Jan. 21, 1974 United Kingdom............... 2765/74

[52] U.S. Cl.............................. 250/571; 356/120; 356/209
[51] Int. Cl.²........................................ G01N 21/30
[58] Field of Search ........... 356/118, 120, 209, 212; 250/225, 563, 572, 571

[56] References Cited
UNITED STATES PATENTS

| | | |
|---|---|---|
| 2,446,628 | 8/1948 | Brown................................. 356/120 |
| 3,591,291 | 7/1971 | Greer et al.......................... 356/212 |
| 3,748,484 | 7/1973 | Covault............................... 250/225 |
| 3,761,179 | 9/1973 | Plummer et al. .................. 356/120 |
| 3,792,930 | 2/1974 | Obenreder........................... 356/209 |
| 3,857,637 | 12/1974 | Obenreder........................... 356/209 |

*Primary Examiner*—Archie R. Borchelt
*Assistant Examiner*—D. C. Nelms
*Attorney, Agent, or Firm*—Cushman, Darby & Cushman

[57] ABSTRACT

The roughness of a surface is determined by directing a laser beam, or other electromagnetic radiation, onto a number of small areas of the surface in turn and measuring intensity of radiation scattered from the small illuminated areas with detectors arranged at a number of angles to the surface. Both the height of surface irregularities and average statistical wavelength may be found without physical contact with the rough surface.

8 Claims, 9 Drawing Figures

MEASUREMENT OF SURFACE ROUGHNESS

This invention relates to the measurement of surface roughness or irregularities by measuring the statistics of scattered electromagnetic radiation.

At present surface roughness of machined surfaces is measured by tracking a fine stylus along a surface to obtain a profile from which the surface can be classified.

In the present invention electromagnetic radiation is shone onto a surface and the reflected radiation processed to provide a measure of the surface roughness.

According to this invention a method of measuring surface roughness comprises the steps of directing a beam of electromagnetic radiation onto a small area of a surface to be measured, applying a relative movement between the surface and the beam in a direction having a component normal to the beam, detecting intensity of radiation scattered at one or more angles from the surface and processing the detected radiation to determine characteristics of the surface irregularities.

Apparatus for carrying out the method of this invention may comprise a source of electromagnetic radiation for illuminating a small portion of a surface to be measured with a beam of radiation, detector means for measuring radiation reflected from a surface at an angle to that surface, means for producing relative translation movement between the beam and the surface, and circuitry for producing the values of average intensity and average of the square of the intensity of measured reflected radiation.

In principle additional information may be obtainable from averages of higher powers of the intensity.

The source may provide electromagnetic radiation of any wavelength $\lambda$, for example it may be a laser, operating in the visible or infra red spectrum, an ultra violet source, an X-ray source or a microwave source.

Visible light may be produced by high brightness sources other than a laser, for example mercury lamps.

The invention will now be described, by way of example only, in the accompanying drawings of which:

Figure 1:
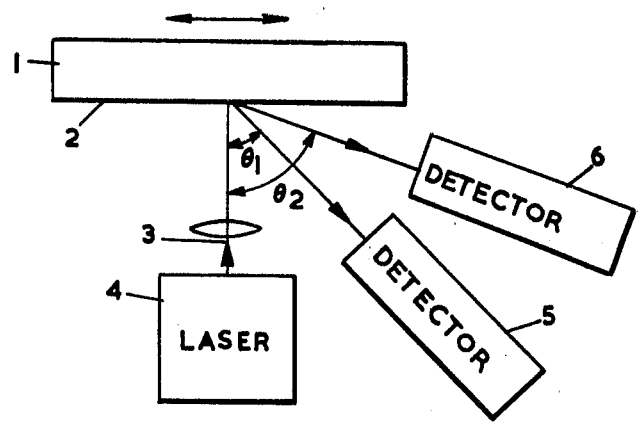
FIG. 1 is a schematic view of apparatus for measuring surface roughness.

As shown in FIG. 1 an object 1 whose surface 2 is to be measured is illuminated by light 3 from a laser 4. In this example the light 3 is arranged normal to the surface 2 and may be scanned along the surface 2 or in most cases the object 1 moved in a direction parallel to its surface 2. Two photo detectors 5, 6 are arranged at angles $\theta_1$, $\theta_2$ to the light 3 and measure the intensity of light reflected by the surface 2. Alternatively output from the laser may be split into two beams which illuminate the same area, and a single detector used to measure reflections at two angles. The output of the detectors 5, 6 will be a current which is proportional to intensity.

Figure 2:
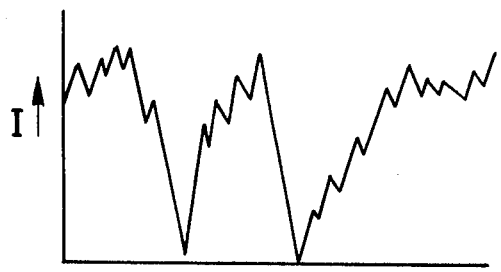
FIG. 2 shows a typical current output of a detector with time.
Figure 3:
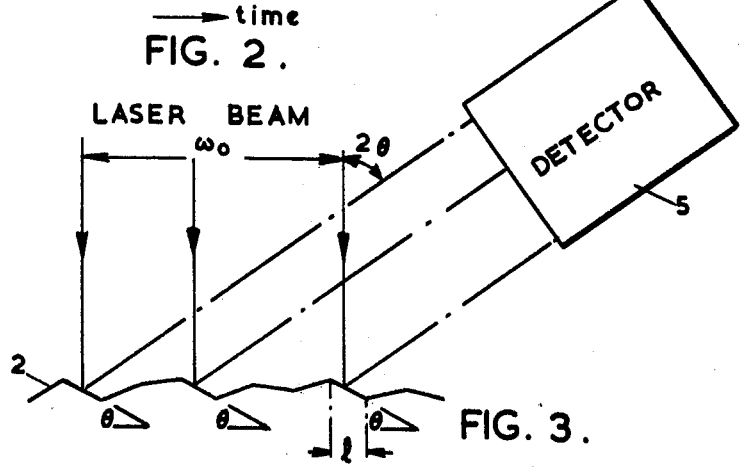
FIG. 3 is a cross-section of a simple rough surface illuminated by a plane wave.

FIG. 3 shows a simplified rough surface 2 illuminated by a beam of laser light 3 of diameter $w_0$. A photo detector 5 arranged at angle $2\theta$ to the incident light receives reflected light from the sides of the surface irregularities. At a point in time if many small slopes are at an angle $\theta$ then a large amount of light will be received by the detector 5. If however, few slopes are at angle $\theta$ then little light will be received by the detector 5. Thus as the surface 2 is translated the detector 5 will receive varying amounts of light depending on the number of slopes, within the beam $w_0$, that are at angle $\theta$. The output from the detectors FIG. 2 will be a current, proportional to intensity, which varies with time due to movement of the surface 2.

FIG. 2 shows an output I from a detector against time. The average current $<I>$ may easily be measured and squared to form $<I>^2$, likewise the average of the current squared $<I^2>$ is easily found. The two values $<I>^2$, $<I^2>$ and the value of $\theta$ may be used as described below to determine the dimensions of the irregularities shown in FIG. 3.

Examples of circuitry for obtaining the square of the average current $<I>^2$ and the average of the current squared $<I^2>$ are shown in or described with reference to FIGS. 5, 6, 7, and 8.

Figure 5:
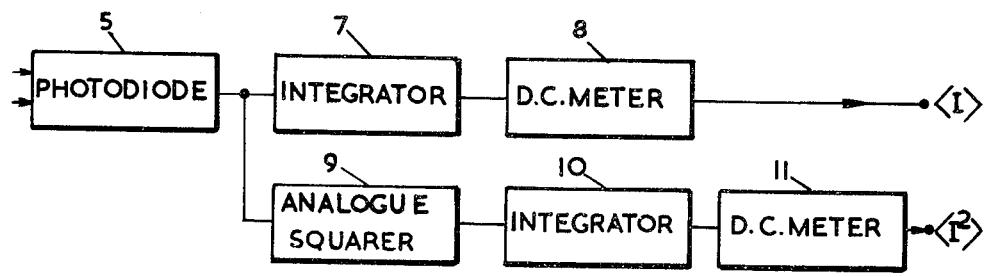
FIGS. 5, 6, 7, 8 show different arrangements for processing information from the detectors.

As shown in FIG. 5 intensity of light is measured by a photo diode 5 whose variable current output is divided and fed (a) into, in series, an integrator 7 a DC meter 8 to measure $<I>$ and (b) into, in series, an analogue squarer 9, an integrator 10, a DC meter 11 to measure $<I^2>$.

The values $<I>$ and $<I^2>$ may then be fed into a standard processing module to calculate $<I^2>/<I>^2$. Alternatively the value $<I>$ may be squared in a squarer to produce $<I>^2$, then $<I>^2$ and $<I^2>$ processed in a module to calculate $<I^2>/<I>^2$.

Figure 6:
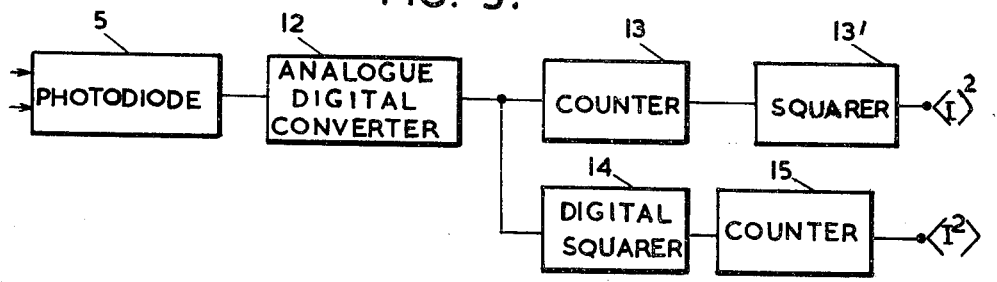

FIG. 6 shows a photodiode detector 5 whose variable current output is fed into an analogue to digital converter 12. The digital output from the converter 12 is counted by a counter 13 to form $<I>$, then squared in a squarer 13' to form $<I>^2$; the converter output is also squared in a squarer 14 and counter 15 to form $<I^2>$.

Figure 8:
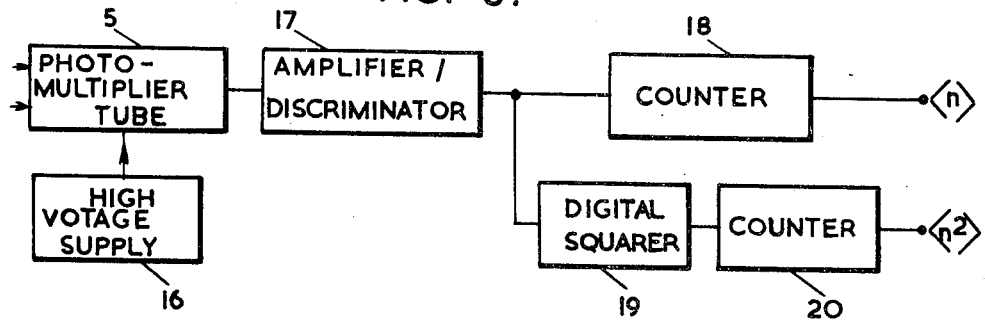
Figure 7:
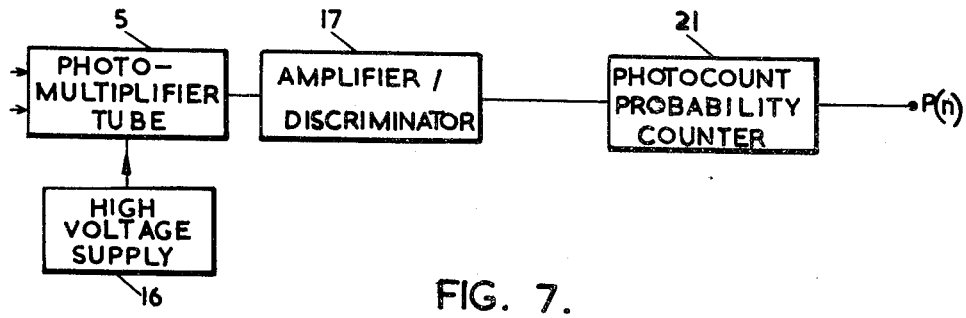

FIG. 7 shows another way of determining $<I>$ and $<I^2>$ which uses a photomultiplier detector 5, power supply 16, and amplifier/discriminator 17 as described in FIG. 8. The output of the discriminator 17 fed into a photocount probability counter 28 (correlator such as that described in U.K. Pat. No. 1,290,336), (e.g. the commercially available 'Malvern system 4300'). This computes the probability distribution of pulses received P(n) where $n$ is the number of pulses received in time T when $T<<T_c$ the fluctuation time of the light being scattered.

It can be shown that $$<I> \propto <n> \equiv \sum_{n=0}^{\infty} nP(n)$$

and $$\frac{<I^2>}{<I>^2} = \frac{<n(n-1)>}{<n>^2} \equiv \sum_{n=0}^{\infty} \frac{n(n-1)P(n)}{<n>^2}$$

Preferably a small computer is programmed to calculate $$\sum_{n=0}^{\infty} nP(n) \text{ and } \sum_{n=0}^{\infty} \frac{n(n-1)P(n)}{<n>^2}$$

FIG. 8 shows a photomultiplier detector 5 supplied with power from a high voltage power supply 16. Output from the detector 5 will be a number of voltage pulses whose rate of occurrence is proportional to intensity. The output from the detector 5 is fed into an amplifier/discriminator 17 which amplifies the voltage pulses and for pulses above a set threshold shapes each pulse to a uniform size. Thus the output of the discriminator 17 is a number of uniform pulses of varying separation. The output from the discriminator 17 is counted 18 to form $<n>$ and squared in a digital squarer 19 then counted 20 to form $<n^2>$ where $n$ is number of pulses received.

It can easily be shown that:

$$<n> \propto <I> \quad <n^2> - <n> \propto <I^2>.$$

The theoretical basis for determining surface roughness by statistical analysis of fluctuations in a scattered signal is as follows.

Figure 4:
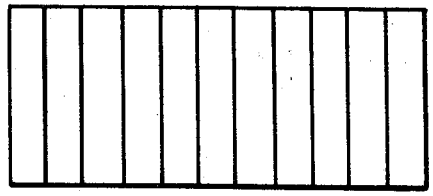
FIG. 4 is a plan view of FIG. 3 showing peaks only.

Consider a grossly simplified model of light scattering from a one dimensional rough surface FIGS. 3 and 4, consisting of strips of width $l$ with random inclinations $\theta$ to the horizontal. Assume that $\theta$ can take on values between 0 and $\pi/4$ and $l$ to be large enough that geometrical optics can be applied. The surface is illuminated normally with a plane wavefront of laser light of width $w_o$. A segment of the surface inclined at angle $\theta$ will scatter a beam at angle $2\theta$ from the normal. Thus a detector in the far-field set at scattering angle $2\theta$ will detect an intensity (assuming the area of the detector to be larger than the central diffraction produced by the illuminated region, so that intensities add)

$$I_{2\theta} = A l n_\theta \qquad 1.$$

where $A$ is a constant of proportionality, and $n_\theta$ is the number of segments inclined at angle $\theta$ in the illuminated region of the surface. In general $w_o$ will not necessarily be much greater than $l$ (see below). Thus to obtain a good average of the surface topology it will be necessary to translate the surface across the illuminating beam. Then the average intensity scattered at angle $2\theta$ will be given by $$<I_{2\theta}> = A l <n_\theta> \qquad 2.$$

where $<n_\theta>$ is the average number of segments inclined at $\theta$ in the illuminated region. Therefore by translating the surface and measuring $<I_{2\theta}>$ as a function of $\theta$, information is obtained on the number of segments inclined at a given angle i.e. the distribution of slopes. Note however that it is not easy to obtain the absolute value of $<n_\theta>$. By measuring $<I_{2\theta}>$ alone, it is not possible for instance to distinguish between the two very different hypothetical surfaces of a few large, long, surfaces at inclination $\theta$ or numerous small, short, surfaces each at inclination $\theta$.

Consider, however, fluctuations in the intensity scattered at angle $2\theta$. From equations (1) and (2)

$$\frac{<I_{2\theta}^2> - <I_{2\theta}>^2}{<I_{2\theta}>^2} = \frac{<n_\theta^2> - <n_\theta>^2}{<n_\theta>^2} \qquad (3)$$

If it is now assumed further that the angles $\theta$ are uncorrelated between different segments, then it might be assumed that $n_\theta$ is Poisson distributed over the various regions of dimension $w_o$ and Equation 3 becomes $$\frac{<I_{2\theta}^2>}{<I_{2\theta}>^2} - 1 = \frac{1}{<n_\theta>} \qquad (4)$$

Thus by measuring $<I_{2\theta}>$ and $<I_{2\theta}^2>$ at angle $\theta$ and calculating the relative mean square fluctuations ('the noise') Equation 4 the actual value of $<n_\theta>$ can be obtained. Making measurements at all $\theta$ provides a complete set of $<n_\theta>$'s. Obviously, then $$l = \frac{w_o}{\Sigma <n_\theta>}. \qquad (5)$$

and a mean square slope could be defined as:

$$\overline{m^2} = \frac{\Sigma \tan^2\theta <n_\theta>}{\Sigma <n_\theta>} \qquad (6)$$

from which an r.m.s. height fluctuation $$\sqrt{\overline{h^2}} = l \sqrt{\overline{m^2}}$$

can be calculated. By measuring fluctuations in the scattered intensity, therefore the simple surface of FIG. 1 can be characterised by the parameters $\overline{h^2}$ and $l$.

Note that if $w_o >> l$ $<n_\theta>$ will always be large, the mean square fluctuations will be small, and the measurement will be difficult. Thus the optimum operating conditions will be when the incident beam illuminates only a few surface irregularities. A laser beam can easily be focussed to a waist $w_o$ of a few microns, thus allowing the study of surfaces with characteristic length $l$ down to 1 $\mu$ or so.

Characteristics of a surface may also be found from examination of a spatial intensity correlation function.

Light from a laser (not shown) is directed onto a small area of a surface and scattered radiation measured by two detectors at angles $\theta_1$ and $\theta_2$ to the surface; the angle $\theta_2$ being variable, e.g. by sweeping radiation onto the detector by a revolving mirror or sweeping the detector in an arc.

In operation light from the laser is scattered from the surface and detected for a range of $\theta_1 - \theta_2$ values (at a steady $\theta_1$). Output from both detectors is processed to provide its spatial intensity correlation function $$\frac{<I_{\theta_1} \cdot I_{\theta_2}>}{<I_{\theta_1}><I_{\theta_2}>}.$$

Such processing may be achieved by feeding the two detector outputs into the two inputs of a correlator, e.g. the commercially available Malvern system 4300 and described in U.K. Pat. No. 1,290,336.

Figure 9:
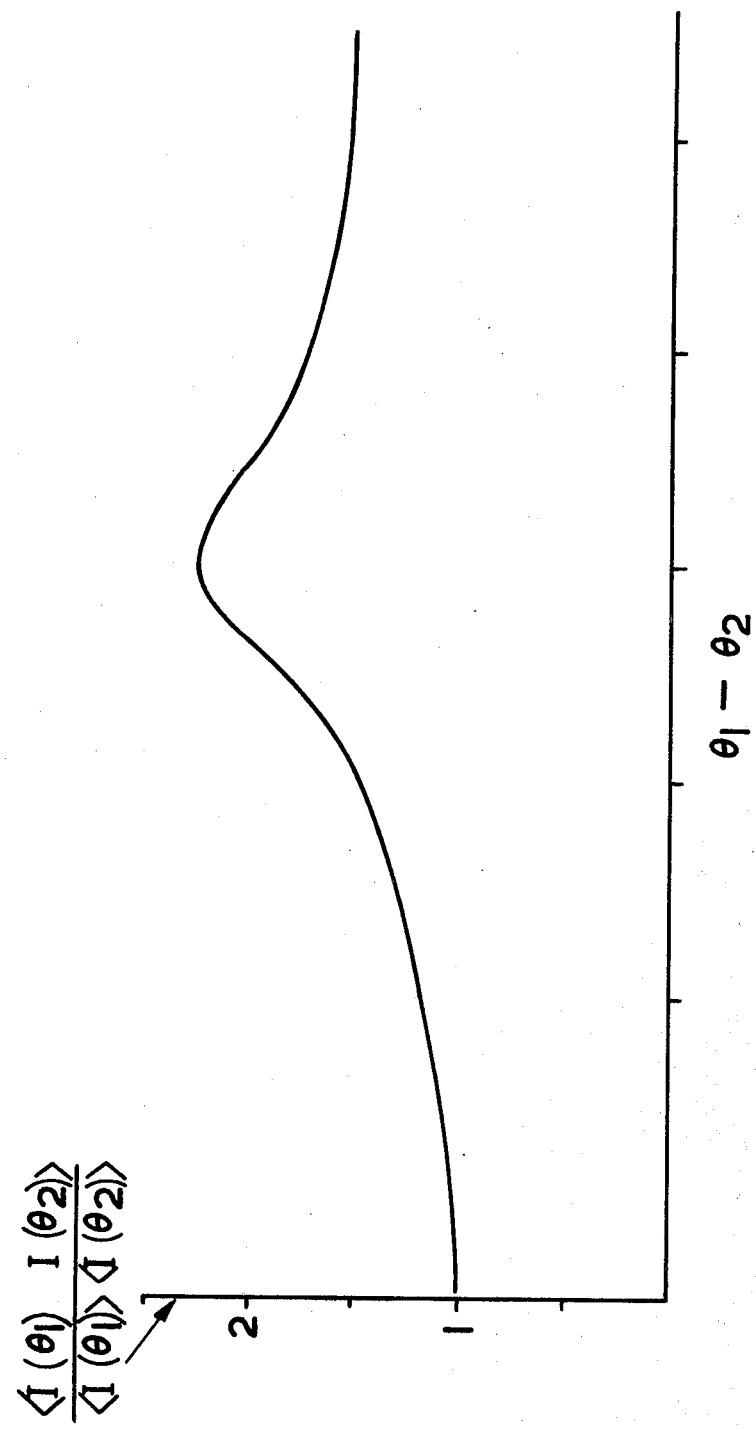
FIG. 9 shows a spatial intensity correlation function.

Output from the correlator may be displayed on an oscilloscope and may be of the form shown in FIG. 9. The angular width $\Delta\theta$ at half-height (for the example shown, half height is about 1.6) is related to the characteristic length $l$ of the surface through the equation $\Delta\theta \approx \lambda/l$, $\lambda$ being laser wavelength.

The simple model, FIGS. 3 and 4, shows the potential for the study of rough surfaces by measuring the statistics of scattered electromagnetic radiation. By making measurements at all angles it should be possible to characterise the surface completely. Alternatively, if there is some prior knowledge of the surface characteristics, measurements at one or two angles could suffice. An example is considered below of a frequently assumed surface in which the distribution of heights is taken to be joint Gaussian.

First however consider more realistic situations than the simple FIGS. 3, 4. If, for example coherent detection is used (detection area smaller than aperture diffraction lobe) it is not possible, as in the case considered above, simply to add intensities at the detector. It is necessary to add electric fields and allow for the fact that the differently phased contributions from different inhomogeneities in the surface can interfere at the detector. (This gives rise to the well-known speckle-pattern phenomenon). One result of this is that even for $w_0 >> l$, where there would be a virtually constant intensity in the example given above, there are, with a laser, fluctuations leading to:

$$\frac{<I^2>}{<I>^2} - 1 = 1 \quad \text{(when } W_o >> l) \tag{7}$$

(This is the so-called Gaussian regime for laser-light scattering since the fluctuations in the scattered electric field are Gaussian distributed.) In the non-Gaussian regime, $w_o \sim l$ terms similar to the R.H.S. of Equation 4 will appear in Equation 7, carrying information about the surface.

In the above simple model FIGS. 3, 4 diffraction effects of the small inhomogeneities were neglected. In practice a small spread of surface slopes will contribute to the intensity at a given angle due to the finite width of the diffraction patterns provided by the surface facets. Both the reflectance properties of the surface and polarisation effects must also be considered in a detailed calculation of the fluctuations expected in the light scattered from a given surface.

Equations for one particular example, Gaussian surface, may be derived taking account of the above effects. For such a surface the heights $h(r_1)$, $h(r_2)$ at points $r_1$ and $r_2$ are distributed according to the probability function $$P(h(r_1), h(r_2)) = \frac{1}{2\pi \sqrt{1-p^2(r_1-r_2)}} \exp - \frac{(h_1^2 + h_2^2 - 2h_1 h_2 p(r_1-r_2))}{2(1 - p^2(r_1 - r_2))} \tag{8}$$

where $$p(r - r') = \frac{<h(r_1)h(r_2)>}{<h^2>}.$$

is characterised by the correlation length $\xi$ (i.e. average statistical wavelength).

Assuming the surface to be of Gaussian profile illuminated by a laser beam focussed to a waist $w_o$ at the $1/e^2$ intensity point (where $e$ is the base of the system of natural (or Naperian) logarithms and $k = 2\pi/\lambda$) and i. $k^2 \overline{h^2} >> 1$ ii. $w_o \geq \xi$ together with certain restrictions on the reflectance properties of the surface and the polarisation conditions at normal incidence the following equations are obtained:

$$I(\theta) = \frac{1}{(1 + \cos \theta)^2} \exp \cdot \left( \frac{-\epsilon^2 \tan^2 \frac{1}{2}\theta}{4h^2} \right) \tag{9}$$

and $$\frac{<I^2>}{<I>^2} = 2 \left( 1 - \frac{\epsilon^2}{w_o^2} \right) + \frac{k^2 \epsilon^2 \overline{h}^{-2}(1 + \cos \theta)^2}{4w_o^2} \exp \left( \frac{\epsilon^2 \tan^2 \frac{1}{2}\theta}{4\overline{h}^{-2}} \right) \tag{10}$$

Thus measurements at two angles are sufficient to obtain the parameters $\overline{h}^{-2}$ and $\xi$.

One of the internationally known ways of classifying surfaces is to give an arithmetic mean of a surface profile. This is now referred to as Ra and originally referred to in B.S. 1134 as the centre line average, or in the American Standard B 46.1 as the arithmetic average. The American SAEJ 911 specification for sheet steel also uses a count of peaks per unit length of surface.

As noted above, from equation 10, the average height $\sqrt{\overline{h}^{-2}}$ and wavelength $\xi$ is obtained from the apparatus shown in FIG. 1 which therefore enables a surface to be classified.

For some application only one detector set at one angle may be adequate. In such a case a simple meter could be arranged to show $<I^2>/<I>^2$ and a surface rejected if it fell outside previously determined values.

The invention may usefully be employed in processes where material is continually emerging from machinery. For example sheet steel emerging from a rolling mill could be monitored by a laser and one or two detectors and the resulting information fed back into the rolling operation to control surface finish.

The principles described above are applicable at all wavelengths of the electromagnetic spectrum. It can therefore be applied to geophysical systems such as the sea, land masses, planetary surfaces, as well as surfaces which are only rough on an optical scale. use of the higher frequencies e.g. ultra violet or even X rays, results in even finer surface irregularities being characterised.

We claim:

1. A method of measuring surface roughness comprising the steps of directing a beam of electromagnetic radiation onto a portion of a surface to be measured, applying relative movement between the surface and the beam in a direction having a component normal to the beam, detecting average intensity and average of the square of intensity of radiation scattered at at least one angle from the surface, and processing the detected radiation to determine height of irregularities of the surface.

2. Apparatus for measuring surface roughness comprising a source of electromagnetic radiation for illuminating a portion of the surface with a beam of radiation, detector means for measuring radiation reflected from the illuminated portion of the surface, means for producing relative translation movement between the beam and the surface, and means for producing the values of average intensity and average of the square of the intensity of measured reflected radiation.

3. Apparatus according to claim 2 wherein the source of electromagnetic radiation is a laser.

4. Apparatus according to claim 2 wherein the detector means includes two detectors arranged to measure radiation at two different angles to the surface.

5. Apparatus according to claim 4 wherein one of the two detectors is angularly movable with respect to the surface being measured.

6. Apparatus according to claim 2 wherein the detector means is a single detector angularly movable to measure radiation at a number of angles to the surface.

7. Apparatus according to claim 2 wherein the detector means includes a photo diode.

8. Apparatus according to claim 2 wherein the detector means includes a photo multiplier.

* * * * *